United States Patent [19]
Lin et al.

[11] Patent Number: 5,681,409
[45] Date of Patent: Oct. 28, 1997

[54] ULTRASONIC WELDING OF ELECTRICAL PLUG

[76] Inventors: Chien-Ting Lin, 2F, No. 27, Lane 193, Hang Sheng E. Rd., Panchiao City, Taiepei Hsien; Chao-Chuan Chien, 11F, No. 16, Lane 227, Hsin Tai Rd., Hsin Chuang City, Taipei Hsien, both of twx

[21] Appl. No.: 588,759

[22] Filed: Jan. 19, 1996

[51] Int. Cl.⁶ .................................................. B32B 31/16
[52] U.S. Cl. ................. 156/73.1; 156/308.4; 156/309.6; 264/445
[58] Field of Search ................... 156/73.1, 308.2, 156/308.4, 309.6, 580.1, 580.2; 264/442, 443, 445; 439/92, 484, 694

[56] References Cited

U.S. PATENT DOCUMENTS

| | | | |
|---|---|---|---|
| D. 330,009 | 10/1992 | Dickie | D13/133 |
| 3,335,395 | 8/1967 | Smith | 439/694 X |
| 3,760,338 | 9/1973 | Bruels | 439/694 |
| 3,900,360 | 8/1975 | Leatherman | 156/272.4 |
| 4,144,109 | 3/1979 | Waligorski | 156/73.1 |
| 4,284,317 | 8/1981 | Doyle | 439/694 X |
| 4,927,373 | 5/1990 | Dickie | 439/188 |
| 4,927,376 | 5/1990 | Dickie | 439/484 |
| 5,053,926 | 10/1991 | Dickie | 361/424 |
| 5,057,036 | 10/1991 | Dickie | 439/484 |
| 5,139,141 | 8/1992 | Dickie | 206/329 |
| 5,182,032 | 1/1993 | Dickie et al. | 249/91 |
| 5,238,416 | 8/1993 | Dickie | 439/148 |
| 5,288,350 | 2/1994 | Kita | 156/73.1 |
| 5,397,408 | 3/1995 | Guzik et al. | 156/73.1 |

OTHER PUBLICATIONS

*A Guide to Ultrasonic Plastics Assembly*, Branson Instruments, Inc., Dec. 1974, pp. 11–17 and 32–37.

Primary Examiner—James Sells
Attorney, Agent, or Firm—Gifford, Krass, Groh, Sprinkle, Patmore, Anderson & Citkowski

[57] ABSTRACT

A method of ultrasonic welding of plastic members to form a high strength interconnection between the members in the form of a low profile electrical plug. High-frequency (ultrasonic) energy is transmitted by the ultrasonic welding apparatus to compatible plastic parts of the low profile electrical plug. At the intersection of the two parts, a combination of applied force and surface and/or intermolecular friction increases the temperature until the melting point of the thermoplastic is reached. Upon removal of the ultrasonic energy, a bond is produced between the plastic parts, effectively affixing them together in the desired fashion. Typical systems used for ultrasonic welding contain a high-frequency power supply (20–40 kHz). Energy from the power supply is directed into a horn dimensioned to be resident at the applied frequency. Upon contact with the workpiece, the horn transmits the energy into it. The two parts to be welded are aligned in the proper fashion by a support constructed of aluminum or steel.

2 Claims, 1 Drawing Sheet

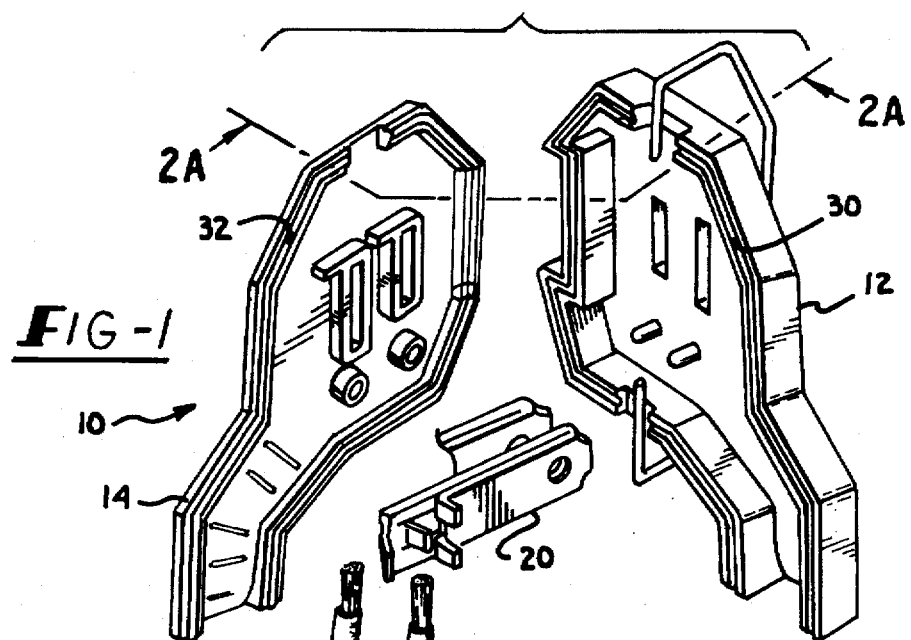
*FIG-1*
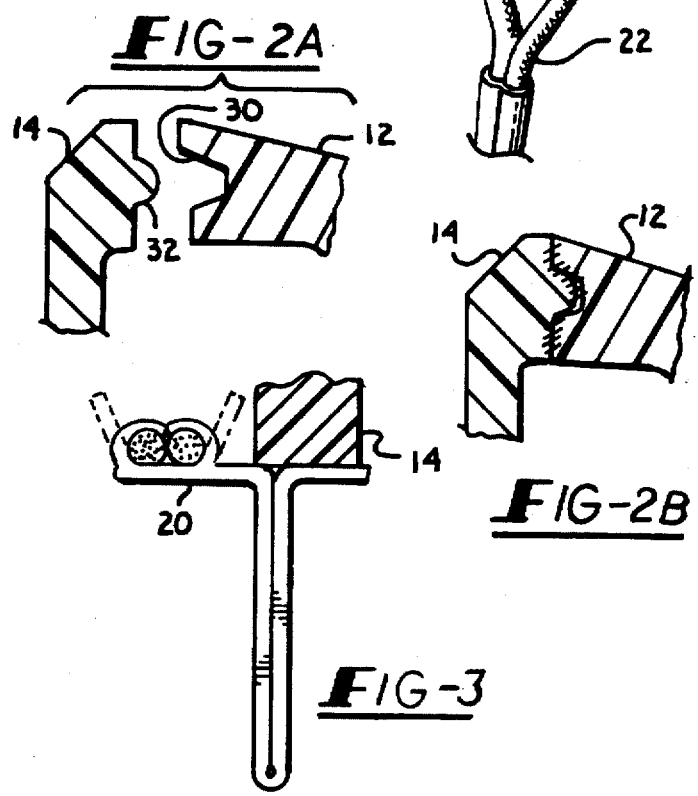
*FIG-2A*
*FIG-2B*
*FIG-3*
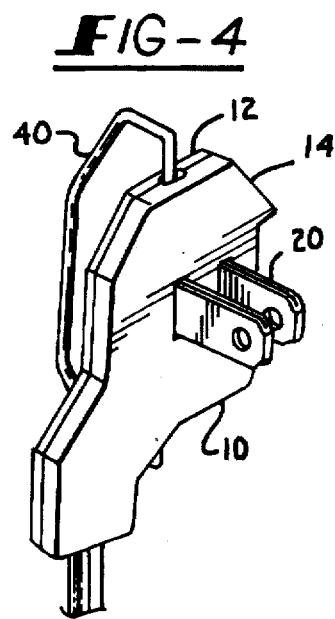
*FIG-4*

ULTRASONIC WELDING OF ELECTRICAL PLUG

FIELD OF THE INVENTION

The present invention relates to a method of ultrasonically welding two plastic parts, in general, and more particularly, to a novel method of manufacturing low profile electrical plugs by ultrasonic welding.

BACKGROUND OF THE INVENTION

Low profile electrical plugs are typically manufactured using an injection molding method. U.S. Pat. No. 5,182,032 to Dickie discloses an injection molding apparatus in which non-rigid or flexible components intended to be encapsulated within the interior of an injection molded product is provided.

Although injection molding is an effective method of manufacturing of low profile electrical plugs, it has been determined that ultrasonic welding the desired portions of the plug is a more accurate and less expensive procedure.

Ultrasonic assembly is well-known, and is suitable for most thermoplastic materials. In practice, high-frequency (ultrasonic) energy is transmitted by the ultrasonic welding apparatus to compatible plastic parts. At the intersection of the two parts, a combination of applied force and surface and/or intermolecular friction increases the temperature until the melting point of the thermoplastic is reached. Upon removal of the ultrasonic energy, a bond is produced between the plastic parts, effectively affixing them together in the desired fashion.

Typical systems used for ultrasonic welding contain a high-frequency power supply (20–40 kHz). Energy from the power supply is directed into a horn dimensioned to be resident at the applied frequency. Upon contact with the workpiece, the horn transmits the energy into it. The two parts to be welded are aligned in the proper fashion by a support constructed of aluminum or steel.

Accordingly, it is therefore a general object of the present invention to provide a method of manufacturing a low profile electrical plug using an ultrasonic welding process that is less expensive and more accurate than conventional injection molding methods.

In accordance with this and many other objects, I have invented a novel method of ultrasonic welding that overcomes the problems others have failed to address.

SUMMARY OF THE PRESENT INVENTION

The present invention is directed to the method of ultrasonic welding of plastic members to form a high strength interconnection between the members in the form of a low profile electrical plug. More specifically, the low profile electrical plug is divided into two individual plastic portions, an upper half and a lower half. Both the upper and lower halves are designed cooperatively such that they may be fastened together. A blade is first inserted into the lower half. After insertion of the blade, the upper half of the plug and the lower half of the plug are ultrasonically welded together. A raised stopper is provided inside the upper half to hold the blade in position after the ultrasonic welding process.

The low profile electrical plug is molded such that the plastic case tapers near the cord entry. This serves to relieve strain on the cord and to prevent the copper wire inside of the cord and plastic case from being damaged.

BRIEF DESCRIPTION OF THE DRAWINGS

Additional objects, advantages, and features of the present invention will become apparent from the following description and appended claims, taken in conjunction with the accompanying drawings in which:

FIG. 1 is an exploded perspective view of the present invention;

FIG. 2A is a cross sectional view along lines 2A—2A of FIG. 1 showing the complementary nature of the upper and lower halves of the plug;

FIG. 2B is a view similar to FIG. 2A but showing the ultrasonic connection of the upper and lower halves of the plug;

FIG. 3 is a view of the blade and raised stopper showing the connection of the wires to the blade; and FIG. 4 is a in perspective view of the electrical plug of the present invention shown ultrasonically welded together.

DETAILED DESCRIPTION OF THE PREFERRED EMBODIMENT

It should be understood that the following description of the preferred embodiment is merely exemplary in nature and is in no way intended to limit the invention or its applications or uses.

For example, the following description of the method of ultrasonic welding, although specifically designed for use in manufacturing low profile electrical plugs, may be used for other purposes such as the construction of any device in which it is desirous to connect portions of a plastic assembly together. Modifications and variations of the present invention will readily occur to those skilled in the art.

Referring now to the drawings, in which corresponding parts are identified with the same reference numeral, and more particularly to FIG. 1, a low profile electrical plug, designated by reference numeral 10, is shown manufactured by the method of ultrasonic welding that is the subject of the present invention. The plug 10 includes an upper half 12 and a lower half 14. The upper half 12 and lower half 14 are designed in a complementary fashion such that they may fit together. Although, in the preferred embodiment, the upper half 12 and lower half 14 are constructed of plastic, other materials may be used, with the limitation only that they be capable of being ultrasonically welded together. A blade 20 is provided for electrical connection between wires 22 and an electrical outlet (not shown).

To facilitate the ultrasonic welding process, a groove 30 is positioned around the circumference of upper half 12 of the electrical plug 10. Likewise, a continuous bead 32 is positioned around the circumference of the lower half 14 of the electrical plug. Referring to FIG. 2A, a cross section of the upper half 12 and lower half 14 are shown such that the groove 30—bead 32 interface is shown. It is at this interface that the ultrasonic welding will bind the upper half 12 and lower half 14 together.

To secure the upper half 12 and lower half 14 together, ultrasonic energy is applied to the groove 30—bead 32 interface. Conventionally, ultrasonic welding is carried out through the transformation of 60 Hz alternating current into a high frequency (20–40 kHz) signal, which in turn is converted to mechanical vibrations of similar ultrasonic frequency through a piezoelectric transducer. Such energy may come from a sonotrode or horn coupled to a suitable oscillator driven vibratory source. The weld horn is designed to mate with the upper half 12 while the lower half 14 may be constrained by a fixture which serves to prevent its deformation.

The ultrasonic welding process first begins with the application of a mechanical force to first cause the upper half 12 to touch the lower half 14, thus ensuring the intimate contact of the two plastic parts. Once this force is applied, the introduction of ultrasonic energy begins. The ultrasonic energy causes the intermolecular vibrations, and thus frictional heat between the upper half 12 and lower half 14. Through proper groove 30—bead 32 design, the intermolecular friction can be maximized locally, thereby selectively melting portions of the upper half 12 and lower half 14 together at the groove 30—bead 32 interface.

Referring now to FIG. 2B, a cross section of the upper half 12 and lower half 14 are shown after the ultrasonic welding process. As is demonstrated, the groove 30—bead 32 interface is effectively welded together. FIG. 3 details the connection between the copper wires 22 and the blade 20. Essentially, the blade 20 includes a U-shaped structure to which the copper wires may be attached through crimping.

FIG. 4 shows the flat electrical plug 10 manufactured according to the process of ultrasonic welding herein described, showing more particularly the appropriate positions of the raised stopper 40 and the blade 20.

As will readily become apparent, although the preferred embodiment of the present invention was designed with a groove 30—bead 32 interface upon which to facilitate welding of the upper half 12 and lower half 14 together, the plastic parts may be designed in a multitude of ways to permit welding forces in other places.

As will be apparent to one of ordinary skill in the art, the preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

Having thus described my invention, We claim:

1. A method of ultrasonically welding plastic parts to form a low-profile electrical plug, comprising the steps of:

providing two elongated, electrically conductive prongs, each having a first end to be retained within said plug for making connection to respective wiring, each prong further including a second end to protrude externally of said plug for insertion into an electrical outlet;

providing first and second plastic parts that define said electrical plug, said parts including means for internally retaining said first ends of said prongs with said wiring connected thereto, wherein said plastic parts includes a peripheral bead which is substantially continuous except for a portion to enable said wiring to emerge from said plug, and wherein said second plastic part includes a pair of slotted apertures through which said second ends of said prongs protrude, and a peripheral grove which is continuous except for said portion to enable said wiring to emerge from said plug, and wherein said bead and groove being complementary and forming an interface therebetween;

retaining the first ends of said prongs within said first plastic part;

aligning said first and second plastic parts together such that said bead interacts with said groove with said first ends of said prongs being retained therebetween, and with said second ends of said prongs protruding through said slotted apertures, and with said wiring emerging from said non-beaded and non-grooved portion;

applying a force to said first and said second parts in excess of that required to cause the grove and bead to contact; and welding said first plastic part to said second plastic part through the application of ultrasonic energy to the interface between the bead and groove.

2. The method of claim 1, wherein the step of ultrasonically welding said first plastic part to said second plastic part further comprises the steps of:

providing a 60 Hz alternating current source into a high frequency signal;

inputting the high frequency signal into a piezoelectric transducer;

transforming said high frequency signal into an oscillatory driven vibratory source; and directing the vibratory source to the plastic parts.

* * * * *

UNITED STATES PATENT AND TRADEMARK OFFICE
CERTIFICATE OF CORRECTION

PATENT NO. : 5,681,409
DATED : October 28, 1997
INVENTOR(S) : Lin et al

It is certified that error appears in the above-indentified patent and that said Letters Patent is hereby corrected as shown below:

Column 3, line 38: Replace "We" with --we--.

Column 4, line 6: Replace "said plastic parts" with --said first plastic part--.

Claim 2, lines 4-5: After "source" delete "into a high frequency signal".

Claim 2, line 6: Insert new paragraph: --transforming the 60 Hz current source into a high frequency signal;--.

Signed and Sealed this

Seventeenth Day of February, 1998

Attest:

BRUCE LEHMAN

Attesting Officer

Commissioner of Patents and Trademarks